Patented Nov. 11, 1930

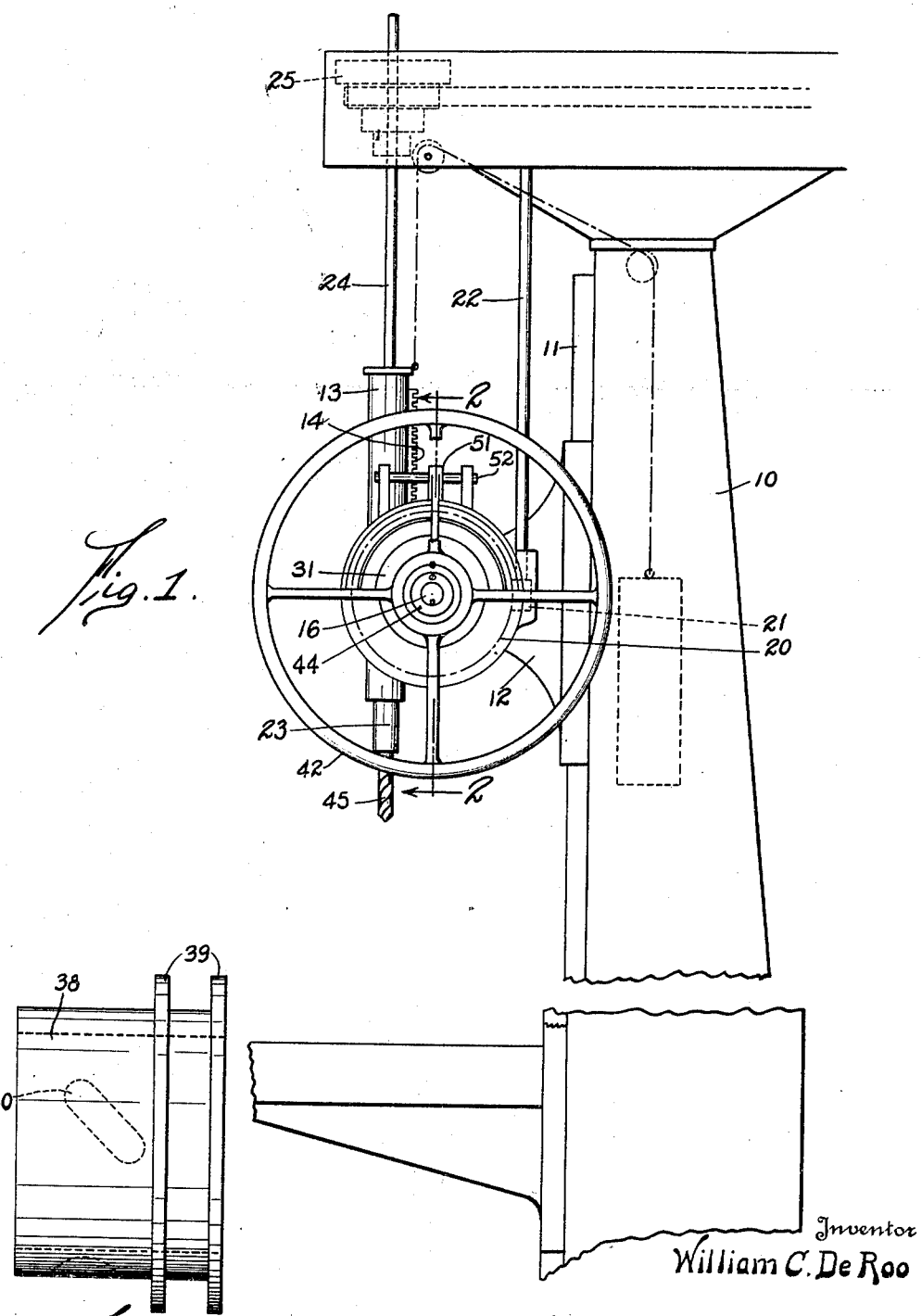

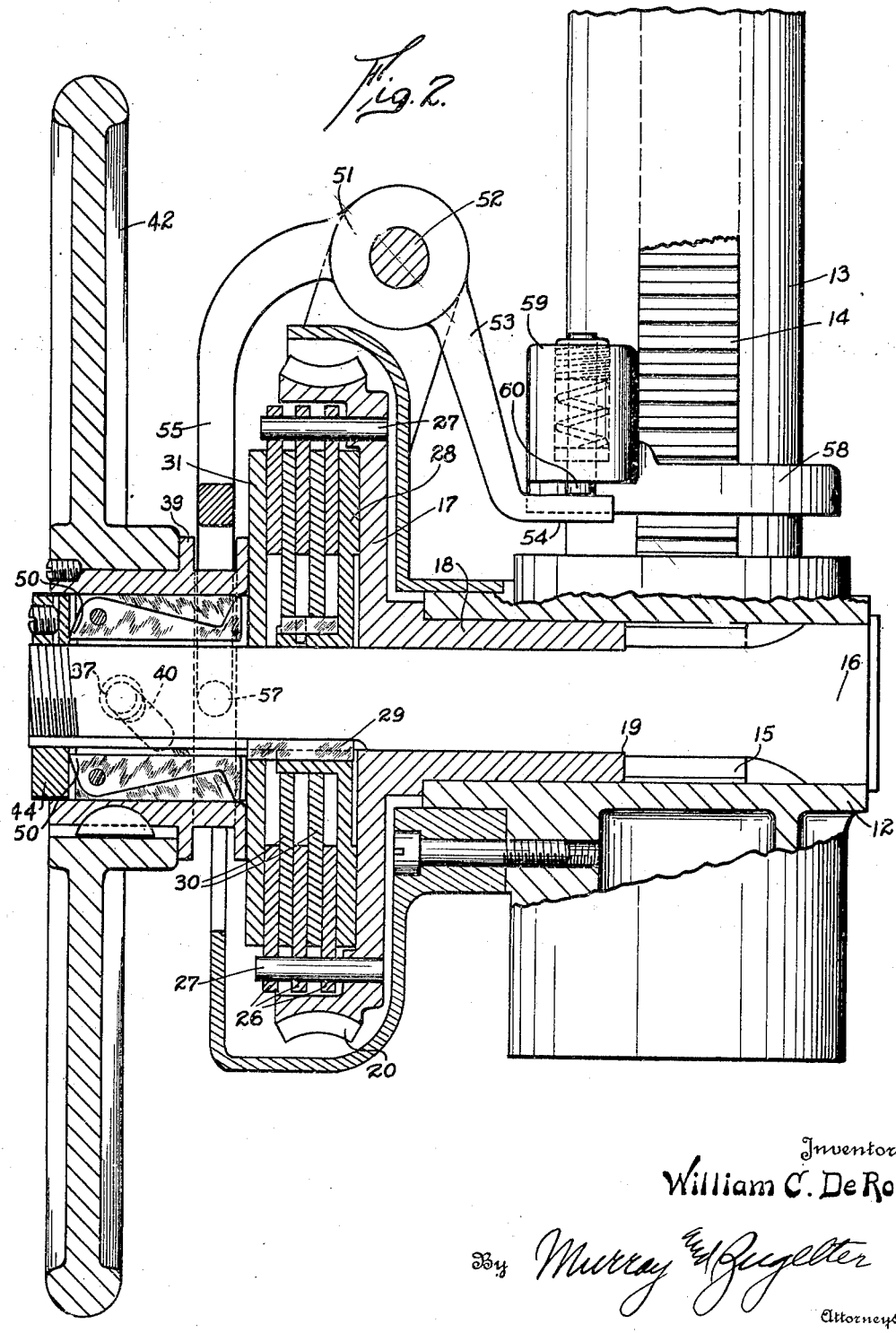

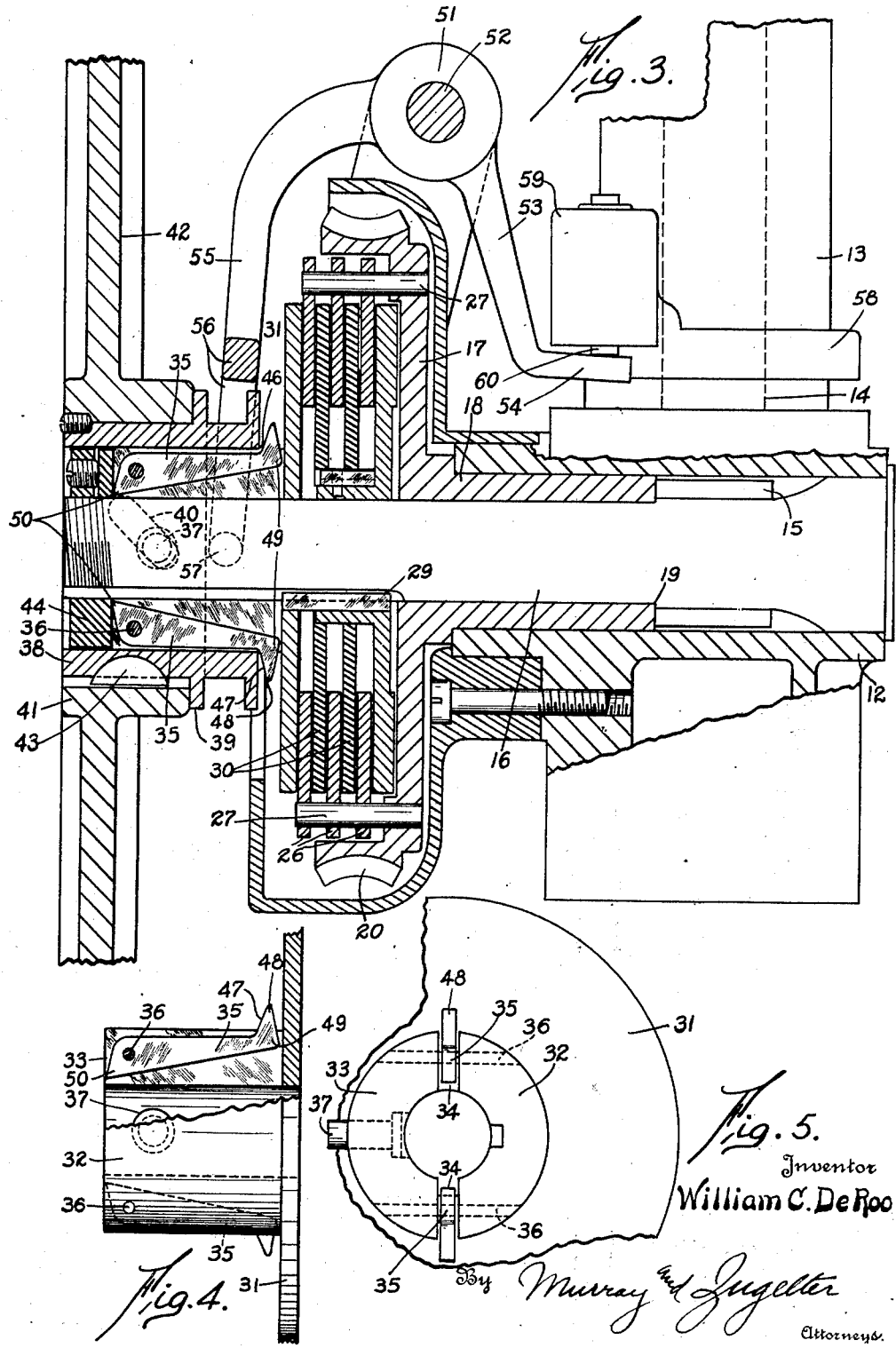

1,781,274

UNITED STATES PATENT OFFICE

WILLIAM C. DE ROO, OF CINCINNATI, OHIO, ASSIGNOR TO THE FOSDICK MACHINE TOOL COMPANY, OF CINCINNATI, OHIO, A CORPORATION OF OHIO

FEED-CONTROL MECHANISM

Application filed February 8, 1927. Serial No. 166,736.

This invention relates to new and useful improvements in a feed mechanism for drilling machines and the like and has for an object the provision of means whereby both hand and power feed are controllable through the instrumentality of a single lever or hand-wheel.

Another object is to provide a feed mechanism of this kind wherein a spindle may be rapidly brought down to the work by manual operation of the hand-wheel or lever and when the drill engages the work, the power feed is automatically engaged by a slight additional manual movement of the hand-wheel or lever.

Another object is to provide a simple and efficient clutch feed which is operable by one hand-wheel for permitting manual feed, and for manually engaging and disengaging the power feed.

Another object is to provide a single lever operated feed which is adaptable to be automatically disengaged at any predetermined depth of feed and which also automatically disengages the feed at the extreme end of the travel of the spindle.

These and other objects are attained by the means described herein and disclosed in the accompanying drawings in which:

Fig. 1 is a fragmental side elevation of a drill press having the feed control mechanism of this invention embodied therein.

Fig. 2 is a cross sectional view on an enlarged scale taken on line 2—2 of Fig. 1, and showing the parts in position for power feed.

Fig. 3 is a view similar to Fig. 2 and showing the parts in position for manual feeding.

Fig. 4 is a side elevation of a part forming a detail of the invention, part being broken away.

Fig. 5 is a fragmental end view of the part shown in Fig. 4.

Fig. 6 is a side view of another part forming a detail of the invention.

In the present invention there is provided a single feed mechanism for a drilling machine or the like and which is operable by means of a single lever or hand-wheel so that a workman may operate and control the machine with one hand, and without the loss of time incident to actuating other feed control levers.

In the drawings 10 represents a drill press column of any approved type with a slide 11 on which the head 12 is slidably and adjustably mounted. A quill 13 carries a rack 14 which meshes with a pinion 15 secured on shaft 16 which is rotatably mounted in the forward portion of the head 12. A clutch member 17 has an extended hub 18 which is mounted for free rotation on shaft 16 and has its end in abutment with the shoulder 19 on the shaft and the pinion 15. The clutch member 17 has its outer circumference developed into a worm-wheel 20 which meshes with a worm 21 carried by power actuated shaft 22. The spindle 23 is rotatable in quill 13 through the agency of shaft 24 which may receive its power from any suitable source such as the cone-pulley 25. The clutch member 17 carries a plurality of friction rings 26 mounted on pins 27 which extend through discs and the clutch member 17. A complementary clutch member 28 is splined to the shaft 16 by any suitable means such as a key 29. Friction discs 30 disposed between the friction rings 26 are suitably mounted on the complementary clutch member 28 for rotation therewith. A disc 31 is passed over shaft 16 and slidably mounted there by means of the key 29. As shown in Figs. 4 and 5 the disc 31 has a split or slotted sleeve extending from one face thereof and comprising sections 32 and 33 having spaces 34 between them in which dogs 35 are pivotally mounted on pins 36. The section 33 has a pin 37 suitably secured thereto and extending for a distance beyond the circumference of the split sleeve. A spool 38 (see Fig. 6) carries a pair of spaced external flanges 39 and is also provided with a diagonal slot 40 into which pin 37 on the split sleeve extends.

From the foregoing it will be apparent that when the spool 38 surrounds the sections 32 and 33 of the split sleeve the spool is capable of limited rotation and reciprocation about the split sleeve. A hub 41 of a hand-wheel 42 (or lever handle if desired) is keyed to the spool 38 by any suitable means such as the key 43 so that the spool and hand-wheel may move as a unit. A suitable lock-nut structure 44 is mounted on the threaded end of shaft 16 and the spool may reciprocate over it. From the foregoing and by reference to the disclosure in Fig. 3 it will be apparent that rotation of the hand-wheel 42 will serve to rotate the spool 38 and that the pin 37 in the split sleeve contained within the slot 40 in the spool offers enough resistance to the inclined wall of the slot to permit manual rotation of the shaft 16. In this way the quill may be manually raised and lowered on the head 12. So long as the spindle 23 meets with no resistance the shaft 16 will remain under the control of the hand-wheel 42. Assuming now that a drill 45 carried by spindle 23 abuts a piece of work to be drilled and is thereby halted in its downward movement of the hand-wheel, it will be noted that the stopping spindle will momentarily stop the shaft 16. If the operator continues to turn the hand-wheel 42 he must apply a slightly increased force thereto, which additional force causes the rotation of the spool 38 relative to the split sleeve and shaft so that the pin 37 rides over the inclined walls of the slot 40 and thereby moves the hand-wheel 42 and spool 38 longitudinally along the split sleeve members 32 and 33 and toward the disc 31. This movement causes the shoulder 46 at the bore in the spool 38 to move over the inclined faces 47 of toe portion 48 on dogs 35 and to move the heels 49 of said dogs toward the shaft. The spool 38 may then receive the entire body of each of the dogs 35 within the bore therein at which time the shoulders 50 at the opposite ends of the dogs 35 abut the inner face of lock-nut 44. The resiliency of the clutch members urges the split sleeve toward the lock-nut 44 so that pressure is exerted on shoulders 50 of the dogs and tends to move them about their pivotal mountings. This binds the toe portions 48 of dogs 35 against the wall of the bore in spool 38 and precludes accidental displacement of the parts. This longitudinal movement of the spool serves to force the disc 31 before it so that the friction rings 26 and friction discs 30 assume a binding relation one on the other whereupon the power movement of clutch member 17 is imparted to clutch member 28, disc 31 hand-wheel and shaft 16. The shaft 16 is thus power actuated and feeds the drill into the work.

If for any reason it should be found desirable to stop the power feed of the spindle, the operator needs but rotate the hand-wheel in the opposite direction whereupon the pin slot arrangement will serve to loosely separate the spool 38 from disc 31, thereby releasing the clutch members and permitting the toe portions 48 of discs 35 to enter the space between disc 31 and the end of spool 38. The clutch may also be thrown out as the operator holds the hand-wheel against rotation, the operation of the parts being the same as just described.

In order to provide an automatic depth stop which will throw out the power feed at a predetermined position of the spindle there is provided a bell crank lever 51 pivotally mounted on a stud 52 fixed to the drill head 12 or any convenient part thereof. The bell crank lever 51 has an arm 53 which carries an offset finger 54 at its extreme end. The opposite arm 55 of the bell crank lever is provided with branches 56 which carry pins 57 extending between the flanges 39 on spool 38. The bell crank lever 51 is rocked about its pivotal mounting whenever the clutch is thrown in and out. An adjustable stop comprising a suitable ring member 58 is adapted to be clamped in adjusted positions about the quill 13 and carries a housing 59 which is disposed above the finger 54 on bell crank lever 51. The housing 59 carries a spring pressed plug 60 which projects from its lower face and contacts the finger 54 when the stop is moved downwardly to the bell crank lever.

Further downward movement of the quill will carry the stop downwardly to move bell crank lever 51 about its pivotal mounting and cause the spool 38 to move outwardly, thereby releasing the clutch and shutting off the power feed. The drill then stops its downward movement. Movement of the spool over the split sleeve permits the toe portions 48 of the dogs to move about their pivotal mountings under the influence of the pressure exerted thereon by lock-nut 44, so that the parts assume the position shown in Fig. 3, and are again subject to manual control.

What is claimed is:

1. In a device of the class described the combination of a reciprocating member, a rack carried by said member, a head providing a bearing for the reciprocating member, a shaft journaled in said head, a pinion on the shaft meshing with the rack for reciprocating the first mentioned member, a freely rotatable power actuated clutch member on the shaft, a complementary clutch element mounted for rotation with the shaft, a hand-wheel having a groove therein, means associated with the hand-wheel whereby the shaft may be manually rotated by said hand-wheel and adapted to be moved by said hand-wheel for effecting frictional binding of the clutch members, a pivotally mounted lever having its ends extending into the groove in the hand-wheel, and an adjustable stop carried by the first mentioned reciprocating member and adapted to effect movement of the lever whereby to automatically disengage the clutch members.

2. In a device of the class described the combination of a shaft, a slotted sleeve mounted for rotation therewith and reciprocable thereon, a pin projecting radially from said sleeve, a dog pivotally mounted on the slot in the sleeve, a spool on the sleeve and having a diagonal slot for receiving the pin on the sleeve and adapted thereby for limited reciprocation and rotation on said sleeve, a nut on the shaft abutting one end of the pivotally mounted dog and urging the opposite end of the dog outwardly of the slot in the sleeve and resilient means normally urging the sleeve toward the nut whereby the free end of the dog may urge the spool longitudinally of the sleeve in one direction, forcible rotation of the spool relative to the shaft serving to move said spool in the opposite direction and to urge the dog into the slot and the spool for frictionally binding the parts in the last mentioned position.

3. In a control mechanism, a rotatably mounted slotted member, a dog pivotally mounted in the slot in said member and having a shoulder extending beyond the end of the slot, the opposite end of said dog carrying an inclined face for movement into and out of the slot, a manually rotatable spool on said slotted member the spool having a cam slot therein, a pin on the slotted member extending into the cam slot in the sleeve and providing for limited reciprocation of the spool over the slotted member and abutment means yieldingly urged against the shoulder of the dog whereby the inclined face of the dog yieldingly resists movement of the spool over the slotted member.

4. In a device of the class described the combination of a feed shaft, a power driven clutch element freely rotatable on said shaft, a complementary clutch element rotatable with the shaft, a disc adapted for moving the last mentioned clutch element into binding relation with the power actuated clutch member, a slotted sleeve on said disc, a dog pivotally mounted in the slot in the sleeve adjacent the end of said sleeve, a shoulder on the dog extending beyond the end of the sleeve, a tapered foot on the opposite end of the dog adapted to extend beyond the body lines of the slot when the shoulder is depressed, a spool mounted for limited reciprocation and rotation on the sleeve and adapted to be manually actuated for manual rotation of the shaft when the dog is in the last mentioned position and a nut on the shaft abutting the shoulder on the dog and normally urging it to the last mentioned position, forcible rotation of the spool relative to the sleeve serving to reciprocate said spool for depressing the dog within the sleeve and urging the disc against the clutch member whereby to effect binding relation of the clutch members for power actuation of the shaft, the frictional engagement of the foot of the dog on the inside of the spool serving to frictionally lock the parts in the last mentioned position.

5. In a combined manual actuating and power control mechanism for machine tools and the like the combination with a shaft having a normally non-engaged power clutch thereon, of a slotted sleeve rotatable with the shaft, a pin extending radially of said sleeve, a dog pivotally mounted in the slot in the sleeve, an abutment on the shaft contacting one end of the dog, and a manually rotatable hub having an internal inclined groove receiving the pin, the contact of the pin on the side wall of the groove serving to impart manual rotation of the hub to the shaft against normal resistance, abnormal resistance to the shaft serving to cause the pin to advance in the groove to effect positive advance of the hub over the sleeve upon further manual rotation on the hub, said positive advance serving to engage the clutch members and to effect binding of the dog between the abutment means and said hub whereby the parts are locked in position, and the shaft and hub are power driven, resistance to the hub serving to effect positive withdrawal thereof to release the clutch members.

6. In a device of the class described the combination of a rotatable shaft, a freely rotatable power actuated clutch member on said shaft, a complementary clutch member mounted for rotation with the shaft, a single hand operable member having a groove therein, means mounted for rotation with the shaft and having a pin extending into the groove in the hand operable member, said pin and groove connection permitting manual rotation of the shaft by the hand member when the shaft is free of abnormal resistance, said connection serving to effect positive longitudinal movement of the hand member for engaging the clutch members upon abnormal resistance to rotation of the shaft and means resisting said longitudinal movement and serving to lock the parts in the last mentioned position, whereby the shaft and hand operable member are power driven, resistance to power rotation of the hand operable member serving to positively retract the parts for releasing the clutch members.

7. In a device of the class described the combination of a reciprocable tool carrying member, a combined manual and power feed control mechanism whereby the tool carrying member may be manually actuated against normal resistance and whereby, upon abnormal resistance to the tool carrying member the control mechanism effects positive connection of power feed therewith, an adjustable depth stop on the tool carrying member and a bell crank lever associated with the control mechanism and operable by the depth stop and directly connected to said combined manual and power feed control mechanism for effecting positive release thereof, said last mentioned mechanism being also hand operable against power actuation for positively disconnecting the power feed.

In testimony whereof, I have hereunto subscribed my name this 29th day of January, 1927.

WILLIAM C. DE ROO.